(12) United States Patent
Scafaria et al.

(10) Patent No.: US 9,785,781 B2
(45) Date of Patent: Oct. 10, 2017

(54) METHOD, APPARATUS, AND COMPUTER-READABLE MEDIUM FOR DATA EXCHANGE

(71) Applicant: DOTALIGN, INC., New York, NY (US)

(72) Inventors: Vince Scafaria, Colts Neck, NJ (US); Jaspreet Bakshi, New York, NY (US); Kenneth Dreyer, Chester, NJ (US)

(73) Assignee: Dotalign, Inc., New York, NY (US)

( * ) Notice: Subject to any disclaimer, the term of this patent is extended or adjusted under 35 U.S.C. 154(b) by 0 days.

(21) Appl. No.: 14/563,171

(22) Filed: Dec. 8, 2014

(65) Prior Publication Data

US 2016/0162695 A1 Jun. 9, 2016

(51) Int. Cl.
  *G06F 21/60* (2013.01)
  *G06F 21/62* (2013.01)
(52) U.S. Cl.
  CPC .......... *G06F 21/604* (2013.01); *G06F 21/602* (2013.01); *G06F 21/6245* (2013.01)
(58) Field of Classification Search
  CPC ... H04L 63/20; H04L 63/102; H04L 63/0227; G06F 21/6218; G06F 21/604
  USPC ............................................................ 726/1
  See application file for complete search history.

(56) References Cited

U.S. PATENT DOCUMENTS

| 6,697,807 | B2 | 2/2004 | McGeachie |
| 6,820,204 | B1 | 11/2004 | Desai et al. |
| 7,630,986 | B1 | 12/2009 | Herz et al. |
| 8,249,903 | B2 | 8/2012 | Pendergraft et al. |
| 8,312,064 | B1* | 11/2012 | Gauvin ............... G06F 21/6218 707/822 |
| 8,442,858 | B1* | 5/2013 | Barnes ................... G06Q 30/02 705/14.4 |
| 8,452,803 | B2 | 5/2013 | Ghosh |
| 8,560,630 | B2 | 10/2013 | Malkhi et al. |
| 8,635,087 | B1 | 1/2014 | Igoe et al. |
| 8,775,287 | B1 | 7/2014 | Igoe et al. |
| 9,077,758 | B1* | 7/2015 | McGovern .............. H04L 63/14 |
| 2002/0156895 | A1* | 10/2002 | Brown ................... G06Q 10/00 709/226 |
| 2006/0248573 | A1 | 11/2006 | Pannu et al. |

(Continued)

FOREIGN PATENT DOCUMENTS

WO     02/082319 A1     10/2002
WO     03/034280 A1     4/2003

(Continued)

OTHER PUBLICATIONS

International Search Report and Written Opinion of the International Searching Authority in corresponding International Application No. PCT/US2015/058353; dated Jan. 21, 2016 (7 pages).

*Primary Examiner* — Baotran N To
(74) *Attorney, Agent, or Firm* — Timothy W. Menasco, Esq.; Harter Secrest & Emery LLP

(57) ABSTRACT

Presented are a method, apparatus, and computer-readable medium for data exchange. The method includes specifying, by a user equipment (UE), a first data, and creating, by the UE, a rule set, the rule set governing access to the first data. The method further includes uploading, by the UE, the first data with the rule set to a user selected server, the first data being accessible at the user selected server based on the rule set.

24 Claims, 8 Drawing Sheets

(56) References Cited

U.S. PATENT DOCUMENTS

Figure 1:
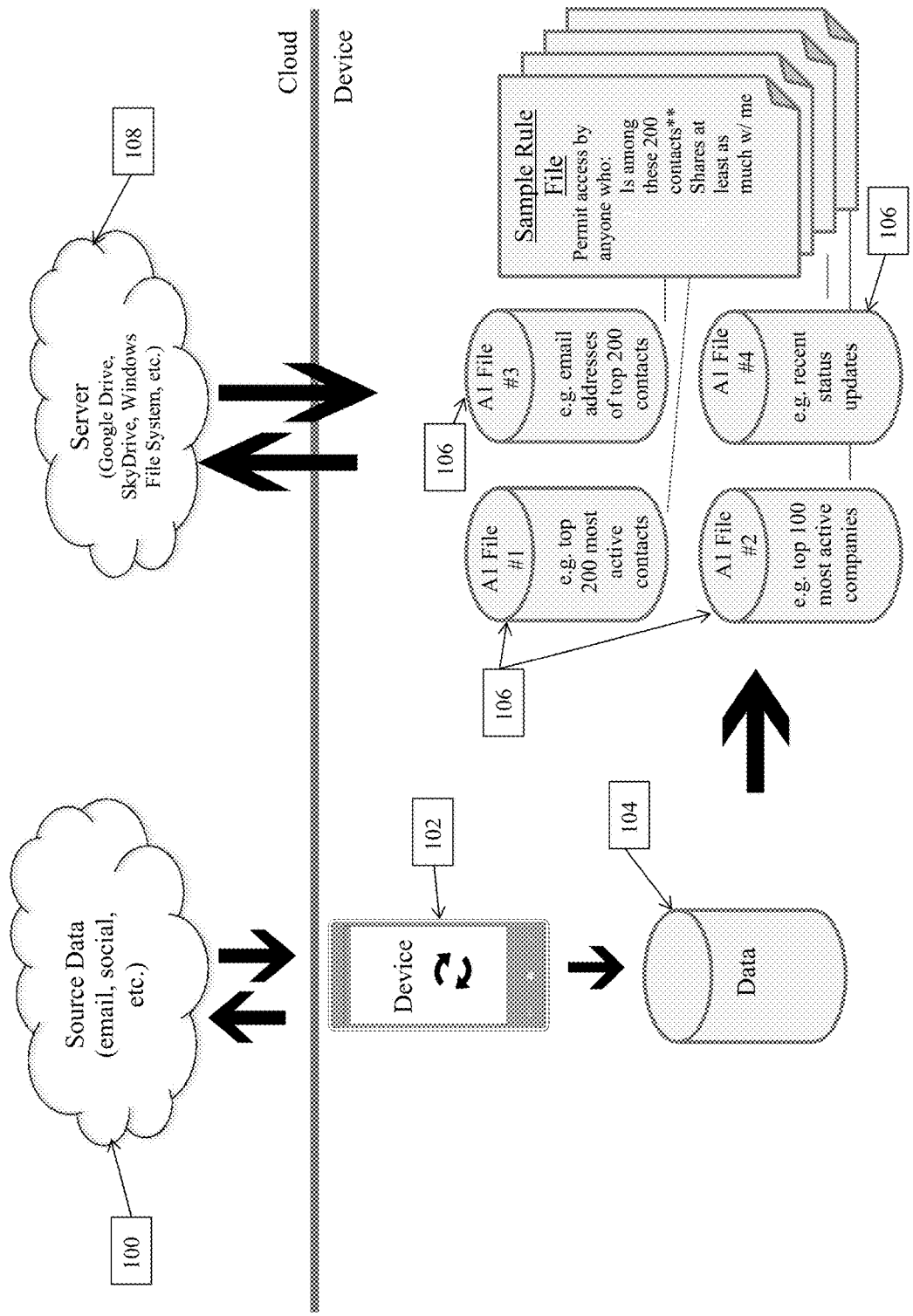

| | | |
|---|---|---|
| 2010/0299340 A1 | 11/2010 | Murthy et al. |
| 2011/0047182 A1 | 2/2011 | Shepherd et al. |
| 2011/0072142 A1 | 3/2011 | Herz et al. |
| 2012/0109830 A1 | 5/2012 | Vogel |
| 2013/0018958 A1 | 1/2013 | McConnell et al. |
| 2013/0091172 A1 | 4/2013 | Kelesis |
| 2014/0080428 A1 | 3/2014 | Rhoads et al. |
| 2014/0181146 A1 | 6/2014 | Jamthe et al. |
| 2014/0244351 A1 | 8/2014 | Symons |

FOREIGN PATENT DOCUMENTS

| | | |
|---|---|---|
| WO | 2014/080072 A1 | 5/2014 |
| WO | 2014/099819 A2 | 6/2014 |

\* cited by examiner

702: (a) specifying, by a user equipment (UE), a first data; (b) creating, by the UE, a rule set, the rule set governing access to the first data; (e) uploading, by the UE, the first data with the rule set to a user selected server, the first data being accessible at the user selected server based on the rule set.

704: wherein the first data comprises status updates, images, geographic location of the UE, and social networking communications.

706: wherein the first data comprises a user's relationship information, contact information, employment information, social media information, and metadata indicating frequency and recency of communications.

708: wherein the rule set identifies third parties that are allowed access to the first data.

710: wherein the first data and the rule set are encrypted using an encryption algorithm specified by a publisher.

712: wherein the rule set comprises a rule governing whether a second user can grant access to the first data to third parties.

714: wherein the rule set allows access to the first data for third parties that reciprocally share data similar to the first data.

FIG. 7

802: (a) authenticating, by a user equipment (UE), an identity of a user of the UE; (b) discovering, by the UE, a data including a rule set that is discoverable by the UE, the rule set governing access to the data; (c) determining, by the UE, whether the user of the UE is allowed access to the data based on the rule set; and (d) in response to determining that the user of the UE is allowed access, accessing, by the UE, the data.

804: the method further comprising in response to authenticating, storing, by the UE, the identity of the user of the UE on the UE in an encrypted tamper-proof format.

806: wherein the data comprises status updates, images, geographic location data of the UE, and social networking communications.

808: wherein the data comprises a third party's relationship information, contact information, employment information, social media information, and metadata indicating frequency and recency of communications.

810: wherein the data comprises a third party's relationship information, contact information, employment information, social media information, and metadata indicating frequency and recency of communications.

812: wherein the rule set comprises a rule governing whether the user can grant access to the data to third parties.

814: wherein the rule set allows access to the data for third parties that reciprocally share data similar to the data.

FIG. 8

METHOD, APPARATUS, AND COMPUTER-READABLE MEDIUM FOR DATA EXCHANGE

BACKGROUND OF THE INVENTION

Field of the Invention

Exemplary embodiments of the present disclosure relate to a method, apparatus, and computer-readable medium for data exchange. Exemplary embodiments of the present disclosure relate more particularly to data exchange between one or more parties.

Description of Related Art

Many business people contend business networking is a more cost-effective method of generating new business than advertising or public relations efforts. This is because networking is a low-cost activity that involves more personal commitment than company marketing time.

Business networking can be conducted in a local business community, or on a larger scale via the internet. Business networking websites have grown over recent years due to the internet's ability to connect business people from all over the world. Internet businesses often set up business leads for sale to bigger corporations and businesses looking for data sources for business.

Before online business networking, there existed face-to-face networking for business. This was achieved through a number of techniques such as trade show marketing and loyalty programs. Though these techniques have been proven to still be an effective source of effective marketing and hence income, many companies now focus more on online marketing due to the ability to track every detail of the campaign and justify the spend involved in these campaigns.

One key factor in the success in any type of networking are the strength, depth, and number of relationships that exist between different individuals. The greater the number of connections between individuals, the more powerful the relationship and the more likely the relationship will lead to advantages in business. However, the power of the relationships of individuals within organizations and the possible interconnected relationships are often unknown. In addition, data representing the relationship and strength of the relationship may be primarily within a single otherwise secure system or database, primarily distributed across a plurality of independent systems or databases, each having its own security, relevance and ownership, or any combination of these sources. Accordingly, there is a need to be able to leverage the relationships between individuals to provide for enhanced networking.

BRIEF SUMMARY OF THE INVENTION

In view of the foregoing, it is an object of the present disclosure to provide a method, apparatus, and computer-readable medium for data exchange in a select, controlled, and predetermined manner.

A first exemplary embodiment of the present disclosure provides a method for data exchange. The method includes accessing, by a user equipment (UE), a first data and analyzing, by the UE, the first data. The method further includes extracting, by the UE, a second data, the second data being based on the analyzed first data and creating, by the UE, a rule set, the rule set governing access to the second data. The method further still includes uploading, by the UE, the second data to a user selected server, the user selected server being independently controlled without required access by a publisher, the second data being accessible at the user selected server based on the rule set.

A second exemplary embodiment of the present disclosure provides an apparatus for data exchange. The apparatus includes at least one processor and a memory storing computer instructions, which computer instructions in select configurations can be a publisher's application, executable by the at least one processor, wherein the memory with the computer instructions and the processor are configured to cause the apparatus to at least access a first data and analyze the first data. The memory with the computer instructions and the processor are configured to further cause the apparatus to extract a second data, the second data being based on the analyzed first data, and create a rule set, the rule set governing access to the second data. The memory with the computer instructions and the processor are configured to further cause the apparatus to upload the second data to a user selected server, the user selected server being independently controlled without required access by a publisher, the second data being accessible at the user selected server based on the rule set.

A third exemplary embodiment of the present disclosure provides a non-transitory computer-readable medium tangibly storing computer program instructions which when executed by a processor, cause the processor to at least access a first data and analyze the first data. The computer program instructions further causing the processor to extract a second data, the second data being based on the analyzed first data and create a rule set, the rule set governing access to the second data. The computer program instructions further causing the processor to upload the second data to a user selected server, the user selected server being independently controlled without required access by a publisher, the second data being accessible at the user selected server based on the rule set.

A fourth exemplary embodiment of the present disclosure provides a method for exchanging data. The method includes accessing, by a user equipment (UE), a first data, the first data being located on a server, the first data being associated with a third party UE and including a rule set governing access to the first data, and analyzing, by the UE, the first data and a second data, the second data being located on the UE. The method further includes creating, by the UE, a third data, the third data being based on a correspondence between the analyzed first data and the analyzed second data, and creating, by the UE, a second rule set, the second rule set governing access to the third data. The method further includes uploading, by the UE, the third data to a user selected server, the user selected server being independently controlled and not accessible by a publisher, the third data being accessible at the user selected server based on the second rule set.

A fifth exemplary embodiment of the present disclosure provides an apparatus for exchanging data. The apparatus includes at least one processor and a memory storing computer instructions executable by the at least one processor, wherein the memory with the computer instructions and the processor are configured to cause the apparatus to at least access a first data, the first data being located on a server, the first data being associated with a third party UE and including a rule set governing access to the first data, analyze the first data and a second data, the second data being located on the memory, and create a third data, the third data being based on a correspondence between the analyzed first data and the analyzed second data. The memory with the computer instructions and the processor are configured to further cause the apparatus to create a third data, the third data being based on a correspondence between the analyzed first data and the analyzed second data, and create a second rule set, the second rule set governing access to the third data. The memory with the computer instructions and the processor are configured to further cause the apparatus to upload the third data to a user selected server, the user selected server being independently controlled and not accessible by a publisher, the third data being accessible at the user selected server based on the second rule set.

A sixth exemplary embodiment of the present disclosure provides a non-transitory computer-readable medium tangibly storing computer program instructions which when executed by a processor, cause the processor to at least access a first data, the first data being located on a server, the first data being associated with a third party UE and including a rule set governing access to the first data, analyze the first data and a second data, the second data being located on a UE, and create a third data, the third data being based on a correspondence between the analyzed first data and the analyzed second data. The computer program instructions further causing the processor to create a third data, the third data being based on a correspondence between the analyzed first data and the analyzed second data, and create a second rule set, the second rule set governing access to the third data. The computer program instructions further causing the processor to upload the third data to the user selected server, the user selected server being independently controlled and not accessible by a publisher, the third data being accessible at the user selected server based on the second rule set.

A seventh exemplary embodiment of the present disclosure provides a method for data exchange. The method includes specifying, by a user equipment (UE), a first data, and creating, by the UE, a rule set, the rule set governing access to the first data. The method further includes uploading, by the UE, the first data with the rule set to a user selected server, the first data being accessible at the user selected server based on the rule set.

An eighth exemplary embodiment of the present disclosure provides an apparatus for data exchange. The apparatus includes at least one processor and a memory storing computer instructions executable by the at least one processor, wherein the memory with the computer instructions and the processor are configured to cause the apparatus to at least specify a first data, and create a rule set, the rule set governing access to the first data. The memory with the computer instructions and the processor are configured to further cause the apparatus to upload the first data with the rule set to a user selected server, the first data being accessible at the user selected server based on the rule set.

A ninth exemplary embodiment of the present disclosure provides a non-transitory computer-readable medium tangibly storing computer program instructions which when executed by a processor, cause the processor to at least specify a first data, and create a rule set, the rule set governing access to the first data. The computer program instructions further causing the processor to upload the first data with the rule set to a user selected server, the first data being accessible at the user selected server based on the rule set.

A tenth exemplary embodiment of the present disclosure provides a method for data exchange. The method includes authenticating, by a user equipment (UE), an identity of a user of the UE, and discovering, by the UE, a data including a rule set that is discoverable by the UE, the rule set governing access to at least a portion of the data. The method further includes determining, by the UE, whether the user of the UE is allowed access to the data based on the rule set, and in response to determining that the user of the UE is allowed access, accessing, by the UE, the data.

An eleventh exemplary embodiment of the present disclosure provides an apparatus for data exchange. The apparatus includes at least one processor and a memory storing computer instructions executable by the at least one processor, wherein the memory with the computer instructions and the processor are configured to cause the apparatus to at least authenticate an identity of a user of the apparatus, and discover a data including a rule set that is discoverable by the apparatus, the rule set governing access to at least a portion of the data. The memory with the computer instructions and the processor are configured to further cause the apparatus to determine whether the user of the apparatus is allowed access to the data based on the rule set, and in response to determining that the user of the apparatus is allowed access, accessing the data.

A twelfth exemplary embodiment of the present disclosure provides a non-transitory computer-readable medium tangibly storing computer program instructions which when executed by a processor, cause the processor to at least authenticate an identity of a user of the apparatus, and discover a data including a rule set that is discoverable by the processor, the rule set governing access to at least a portion of the data. The computer program instructions further causing the processor to determine whether the user of the processor is allowed access to the data based on the rule set, and in response to determining that the user of the processor is allowed access, accessing the data.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

BRIEF DESCRIPTION OF THE SEVERAL VIEWS OF THE DRAWING(S)

FIG. 1 presents a simplified signaling diagram between the devices suitable for use in practicing exemplary embodiments of this disclosure.

Figure 2:
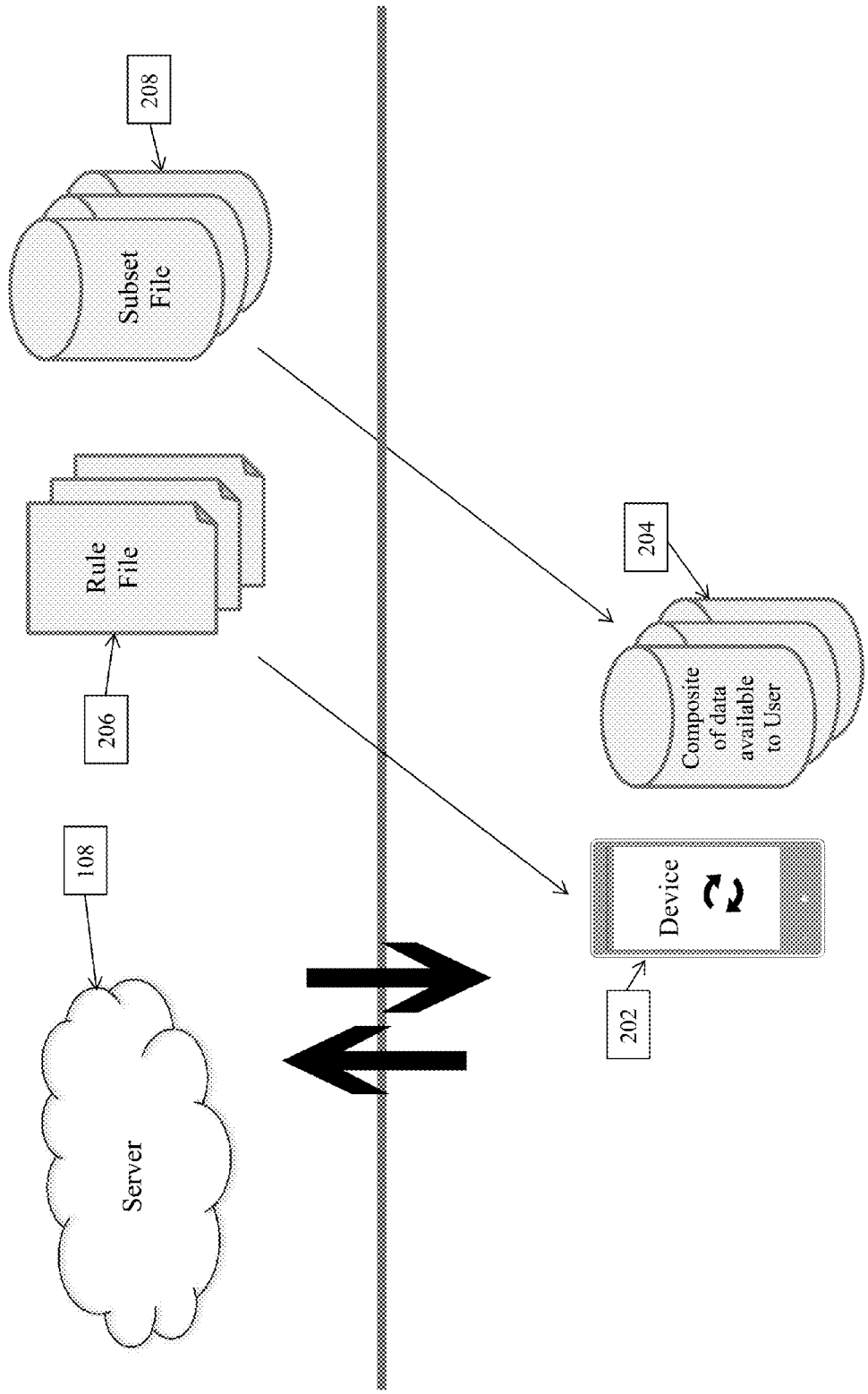

FIG. 2 presents another signaling block diagram between devices suitable for use in practicing exemplary embodiments of this disclosure.

Figure 3:
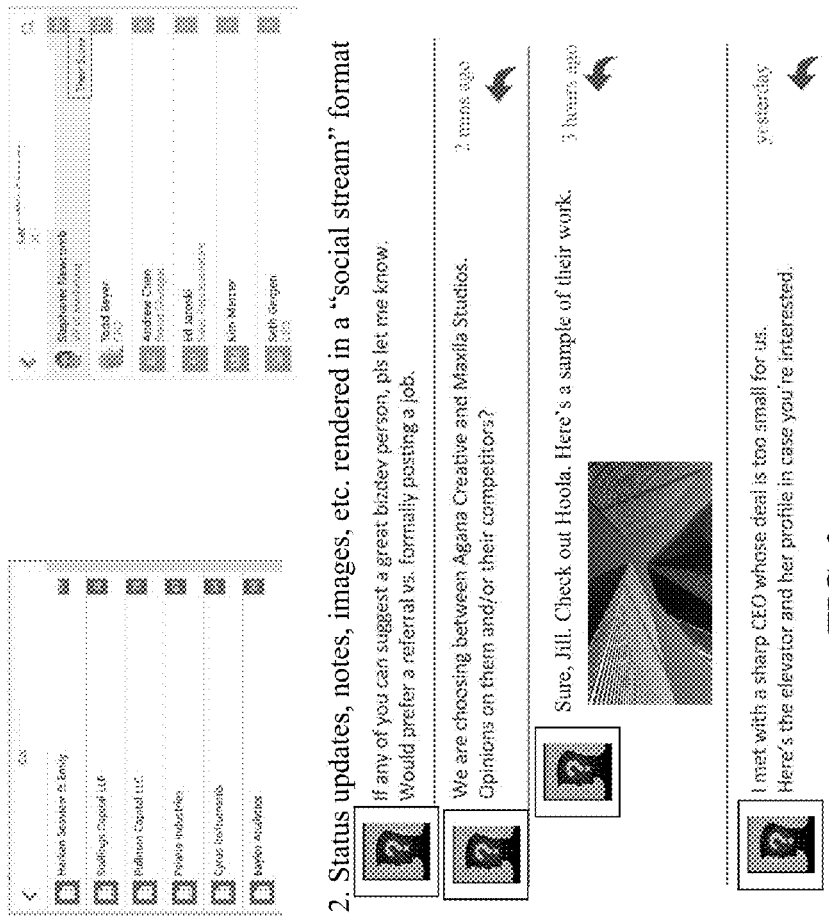

FIG. 3 presents an expanded view of a composite data suitable for use in practicing exemplary embodiments of this disclosure.

Figure 4:
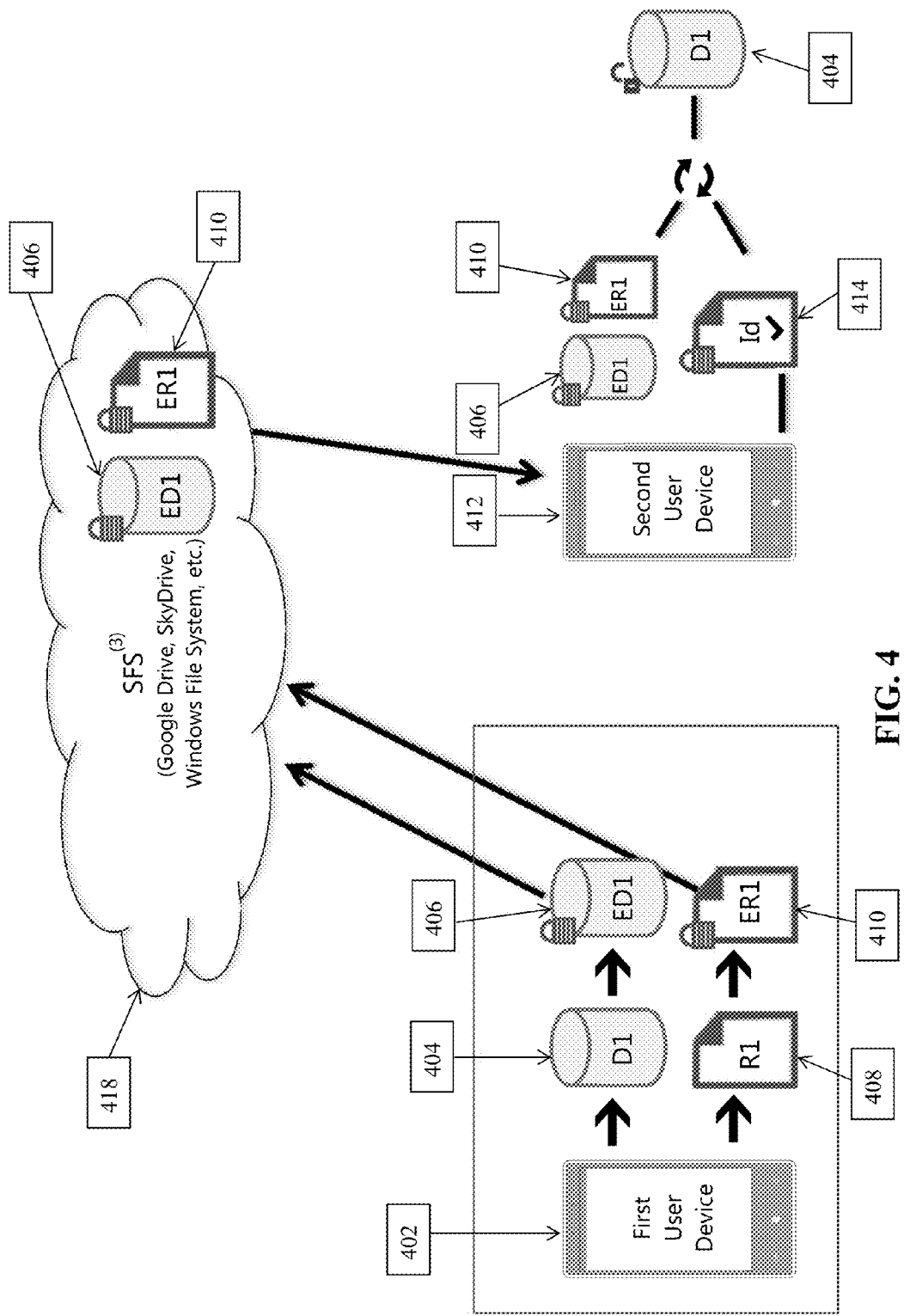

FIG. 4 presents an alternative simplified signaling diagram between devices suitable for use in practicing exemplary embodiments of this disclosure.

Figure 5:
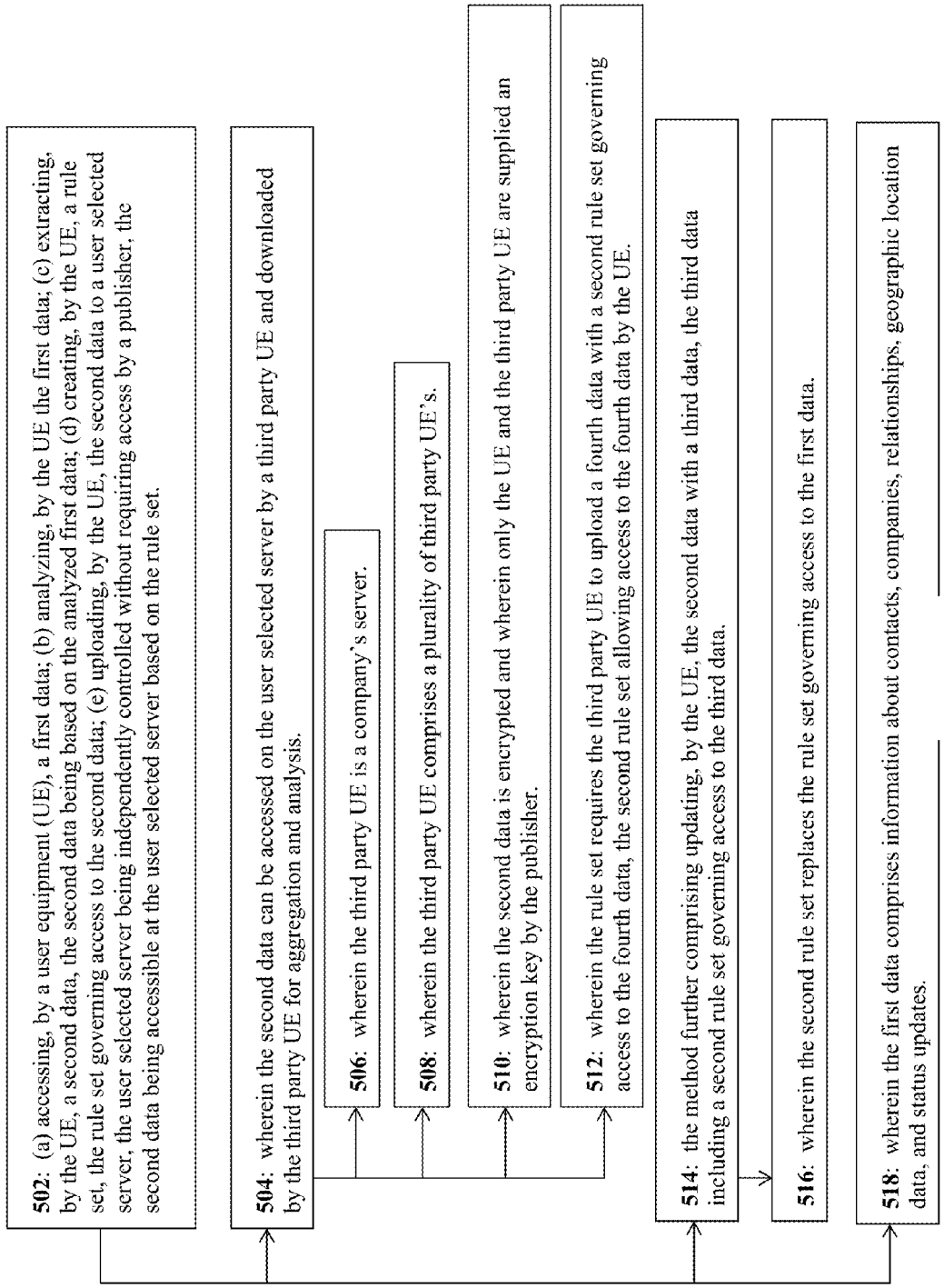

FIG. 5 presents a logic flow diagram in accordance with a method, apparatus, and computer-readable medium for performing exemplary embodiments of this disclosure.

Figure 6:
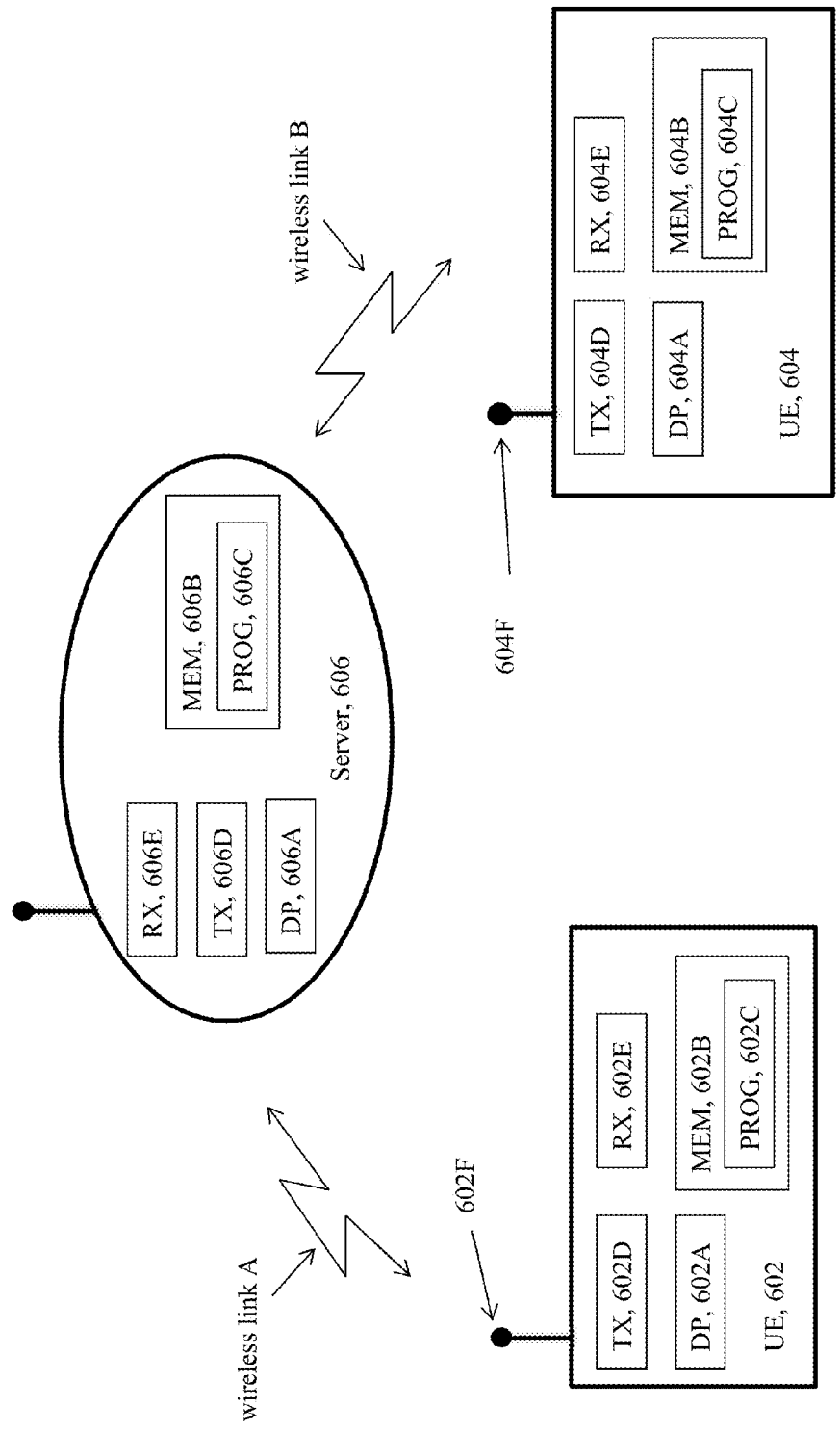

FIG. 6 presents a simplified block diagram of devices suitable for use in practicing exemplary embodiments of this disclosure.

FIG. 7 presents an alternative logic flow diagram in accordance with a method, apparatus, and computer-readable medium for performing exemplary embodiments of this disclosure.

FIG. 8 presents another alternative logic flow diagram in accordance with a method, apparatus, and computer-readable medium for performing exemplary embodiments of this disclosure.

DETAILED DESCRIPTION OF THE INVENTION

Business development professionals typically succeed by leveraging the relationships in their network to generate new business. The more complete and relevant the insight about the relationships of a business professional, the more successful the professional as well as the employer will be in networking and developing business.

However, there are access and structural issues that typically prevent relationship information between parties from being optimized. Corporate email, personal email, and social networks are all rich sources of information about relationships between individuals and companies. Individuals are often reluctant to grant their third parties (e.g., employers) access to personal accounts. Companies are also often reluctant to have a third party access, analyze, and cache data from their servers.

Furthermore, the traditional customer relationship management (CRM) model is hierarchical and is defined by the walls of one organization. Within the walls, deep analysis (e.g. most active relationships based on email/calendar activity), can be performed and the insights based on the analysis made available for sharing. However, beyond the walls, the best available resources are social networks. No one network has all the information about the full web of an individual's relationships, nor does any single resource have simultaneous access to all of a user's email activity and other relationship information. As a result, social networks do not have a complete picture of which relationships are actually relevant.

The problem of hierarchy pertains to companies as well. For example, some companies have very strong relationships with other companies as in the case of private equity and venture capital portfolio companies. Those companies in turn may be related to other loosely affiliated people and companies whose relationships they wish to leverage.

Moreover, the field of information technology includes numerous ways to exchange data between parties. The most popular of types of data exchange include email and text messaging. Email and text messaging are known as reasonably secure and are generally trusted utility services, wherein each party has the reasonable expectation that only the intended parties will receive the information.

In recent years, simple file sharing has come to be viewed with a similar expectation of security. A party who uploads a file to a simple file sharing service, such as a share drive, a Sharepoint server, Google Drive, Microsoft SkyDrive, or the like, has a reasonable expectation that only the permitted recipients will be able to access the file.

Individuals who are further concerned about security have the option to encrypt emails or post encrypted files. This helps ensure that even if an unintended party receives the file, that party will not be able to access and read the data contained within.

However, email, text messaging, and simple file sharing do not allow for rich collaboration similar to customer relationship management (CRM) systems or social networking sites/applications. Users often want more functionality than simply the ability to access files or view lists of chronological messages. Users want to understand relationships between users, contacts, and companies. They want to share status updates, images, and video in a way that is less intrusive than email (which automatically floods the recipient's inbox). They want content intelligently surfaced based on its semantic relevance, including hidden connections and opportunities.

CRM providers and social networks have filled the need for these services. CRM systems and social networks typically operate by allowing users join a central service and submit data which is then held within a single central repository. The administrator of the CRM or social network service including certain employees and contractors can read unencrypted content submitted by the users. The CRM or social network administrator may even be allowed to reuse or distribute this content depending on the terms of use.

Yet, in practice it is often difficult for the different parties to agree on one central CRM/social service to trust. For example, a first individual may feel comfortable uploading data to a first service, whereas a second individual only feels comfortable uploading data to a second service. Without using a common service and a common repository, the parties are typically unable to collaborate in the rich and meaningful ways that CRM and social networks offer.

One problem with using a single central repository is that it typically limits sharing of relationship intelligence across related companies. For example, private equity and venture capital firms often have a large stake in numerous (generally non-competing) businesses. Each of these companies is an entity with its own relationships, where the strongest of these relationships could likely generate sales leads for other related portfolio companies. However, entities under common ownership are just as unlikely to agree on a single central repository for their data or relationships as are individuals. Just as an employee does not want their employer to own and access too much sensitive data, a portfolio company would not want one of its investors or sibling companies to share a single central information repository. In practice, each entity has its own CRM and enterprise collaboration systems. At present, there is no reasonable way for these entities to share (only) the appropriate amount of metadata with each other in an automated way, just as there is no reasonable way for individuals to share only select metadata from their personal email with their employer.

Exemplary embodiments of the present disclosure seek to solve issues of privacy, security, and hierarchy concerning relationship data. Exemplary embodiments provide that relationship data from a number of different sources can be accessed from, analyzed on, and cached onto an electronic device. The user can decide what subset of information can be shared with whom, and make that decision prior to having any data actually leave the electronic device. The data is shared as simple pre-processed files, so the share location can be any file storage location controlled by and trusted by the user (Google Drive, SkyDrive, a network file share, Sharepoint, etc.). The user is not required to trust a specialized "black box" web-based application. Furthermore, data between different users, or in some embodiments even different data of the same user, need not be maintained by a single central server or file storage location. Additionally, separate sets of data belonging to the same user and even separate sets of data, each belonging to different users may be maintained by a single central servers or file storage locations. In this embodiment, each of the separate sets of data, regardless of their ownership are maintained as separate files. Moreover, each unit of data is associated not only to a specific user, but also to a data source (e.g. a specific data is associated to John Doe's Gmail account or Outlook account).

Exemplary embodiments of the present disclosure provide a method, apparatus, and computer-readable medium by which individuals and companies can share information about their relationships. Exemplary embodiments of the present disclosure (1) maintain all data in the sole custody of the participants at all times, (2) obviate the need for a central database or web server, and (3) allow each participant to share only the appropriate subset of information available.

Referring the FIG. 1, shown is a simplified signaling diagram between the devices suitable for use in practicing exemplary embodiments of this disclosure. Shown in FIG. 1 is source data 100, device 102, app generated data 104, app generated subset data 106, and server 108.

Exemplary embodiments of source data 100 include data from a user's email accounts, a user's list of contacts, and a user's list of friends or contacts from social networking sites (e.g., Facebook, Instagram, or LinkedIn). The source data 100 can be maintained in the cloud, such as in the user's respective social networking site accounts, in a cloud backup or storage, or the source data 100 can be maintained locally on the user's device 102. Generally, exemplary embodiments of source data 100 includes any type of data maintained in the cloud or locally which provides information or can provide information about the user's relationships to other individuals or organizations. Exemplary embodiments of source data 100 also include relationship information that is not publically accessible or in other words, accessible only by the user. In another exemplary embodiment, source data 100 is maintained on servers, memory or other device that is owned by a company or employer of the user (e.g., work based email accounts). In this instance, the user (e.g., employer or company administrator) is able to control the source data 100 through settings restricting external sharing of such data through device 102 or an application setting.

Exemplary embodiments of device 102 includes any type of electronic device or user equipment (UE) that can itself maintain data and is capable of wired or wireless transmission of data. Exemplary embodiments of device 102 include a processor, input/output interface such as a display, a memory, a transmitter, and a receiver for transmitting and receiving data. Exemplary embodiments of device 102 include cellphones, smartphones, tablets, laptop computers, desktop computers, and portable electronic devices. Exemplary embodiments of device 102 are able to maintain a user's contact lists, friends lists, social networks and in some instances source data 100. In another exemplary embodiment, device 102 is a web server.

In one exemplary embodiment, as shown in FIG. 1, a user through device 102 authenticates access to source data 100. The source data 100, if maintained in the cloud or in a remote location, is sent securely to device 102. In the instance that the source data 100 is maintained on device 102, once the user authenticates access to source data 100, access is automatically granted.

After the user gains access to source data 100 exemplary embodiments of device 102 will download and cache the source data 100 onto device 102. It should be appreciated that exemplary embodiments of this disclosure include embodiments wherein the steps or functions performed by device 102 or server 108 can be performed in response to computer instructions from an application of a publisher. Exemplary embodiments of the publisher include the company or organization that provides, produces, makes available, or authors the application, which allows device 102 or server 108 to perform exemplary embodiments of this disclosure. Exemplary embodiments of this disclosure further include embodiments wherein device 102 or server 108 perform the steps or functions described herein in response to programming embedded on or within device 102 or server 108.

The cached source data is depicted as the app generated data 104 in FIG. 1. Next, the app generated data 104 is analyzed and aggregated into different categories set by the user illustrated as app generated subset data 106. Exemplary embodiments of analyzing include aggregating app generated data 104 such that the app generated subset data 106 includes a list of the strongest relationships between the user and other individuals or companies/organizations.

For example, if the user has had numerous recent back-and-forth emails exchanged with a given contact, has met the contact recently per their online calendar, has had recent telephone communications, maintains personal contact information such as a mobile phone number, and/or is connected on social networks, these factors would contribute toward a strong relationship between the user and the contact. Furthermore, if the contact is known to work at a given company (per the domain URL implied by a business email address, social account information, or other means), the user is deemed to have a relationship with that company. The more contacts at a given company, the more senior those contacts (based on attributing a seniority ranking to the job title on a contact card or other source of job title), and the more recent the interactions with those contacts, the stronger the relationship for the user with that company.

In other words, the strength of the relationship can be measured by a number of different factors including for example the different ways the user is connected to the other individual or company/organization or the number of text message, phone calls, or emails between the user and the individual or company. So, for example, the created subset of source data 100 (as shown as app generated subset data 106) can include the top 100 strongest contact relationships, the top 10 strongest company relationships, or recent status updates.

Other exemplary embodiments of app generated subset data 106 includes statistics on strength of relationships based on one or more of (i) the number and recency of back and forth emails between the user and a given contact; (ii) the number and recency of calendar appointments between the user and a given contact; (iii) the number and recency of phone calls and text messages; (iv) the number of connections at a given company; (v) the length of calls or emails; or (vi) the occurrence of certain word choices that appear in emails, text messages or other communications. The app generated subset data 106 will typically be maintained locally on device 102.

In other exemplary embodiments, app generated subset data 106 is maintained on device 102 and on other devices or cloud applications/storage through automatic sync functions used by device 102 with other devices or cloud applications/storage.

Each of the app generated subset data 106 will include a rule set that is user defined. The rule set for each app generated subset data 106 will govern access to the app generated subset data 106 by third parties. For example, app generated subset data 106 may include a rule set that only allows third parties to access the app generated subset data 106 provided that the third parties likewise allow access to their corresponding app generated subset data 106.

Another exemplary rule set for app generated subset data 106 would be a rule set that allowed third parties to access the app generated subset data 106 provided that the third party is a contact of the user or perhaps has had minimum connections with the user, for example defined as having over 50 telephone calls with the user. A further exemplary rule set for app generated subset data 106 grants access to only one particular individual or company.

FIG. 1 next illustrates that the user authenticates through device 102 to access to server 108. Server 108 is typically a user defined or user selected server or user selected file server. The app generated subset data 106, including the associated user created rule set, can be encrypted and uploaded to server 108. An exemplary encryption includes a symmetric encryption such as Rijndael, since the publisher or publisher application will be used for both encryption and decryption (without the publisher itself ever being able to access the files, since the user can choose a server not controlled by the publisher). Exemplary embodiments of server 108 include any type of server that is known in the art including but not limited to, for the avoidance of doubt, web servers and file servers. Exemplary servers 108 include one or multiple processors, memories, transmitters and receivers for transmitting and receiving data wired or wirelessly. Exemplary embodiments of server 108 include a single server and multiple servers. Exemplary servers 108 include Google Drive, SkyDrive, Windows File System, Drop Box and the like.

Once the user uploads the app generated subset data 106 to server 108, third parties that meet the rule set criteria may access the app generated subset data 106. Otherwise, the app generated subset data 106 is not accessible by any other party other than the user and the allowed third parties. The hosting organization, or company that maintains/operates server 108 does not have access to the app generated subset data 106 unless granted by the user by the rule set. This is because accessing the app generated subset data 106 requires not only accessing the file, but also adhering to the rule set that the publisher application checks prior to decrypting and granting access.

Exemplary embodiments of the present disclosure provide that the rule set for a given app generated data 104 or app generated subset data 106 can be changed by the user after proper authentication. In this embodiment, third parties who were previously granted access by a prior rule set may be denied access based on the new rule set and third parties who previously did not have access may now be granted access.

Referring to FIG. 2, shown is another signaling block diagram between devices suitable for use in practicing exemplary embodiments of this disclosure. Shown in FIG. 2 is server 108 and device 202. Exemplary embodiments of device 202 include any type of electronic device that can itself maintain data and is capable of wired or wireless transmission of data. Exemplary embodiments of device 202 include a processor, a memory, an input/output user interface, a transmitter, and a receiver for transmitting and receiving data. Exemplary embodiments of device 202 include cellphones, smartphones, tablets, laptop computers, desktop computers, and portable electronic devices. Exemplary embodiments of device 202 are able to maintain a user's contact lists, friends lists, and social networks. In other exemplary embodiments, device 202 is a web server.

Exemplary embodiments of subset file 208 include, but are not limited to, another user's relationship information, status updates, contact lists, and uploaded files. In other exemplary embodiments, subset file 208 merely contains data that is or has been uploaded by another entity, which can be either individuals, companies, or organizations. Exemplary embodiments of rule file 206 include a rule or rules that govern access to subset file 208.

In practice, as depicted in FIG. 2, a third party user through device 202 authenticates with server 108. Exemplary embodiments of authenticating are those known in the art including logging into server 108 with a username and password, or could be Windows Authentication in the case of networked users on a corporate domain accessing a networked server. Device 202 will then automatically discover whether server 108 contains a rule file 206. If the user of device 202 is meant to have access to the subset file 208 associated with the rule file 206 on server 108 then the device 202 will be granted access to the data on server 108. Device 202 will then download the subset file 208 from server 108, which will then be stored locally on device 202. Device 202 will then decrypt and unlock subset file 208. Typically, the unlock code for subset file 208 will be extracted from the rule file 206. Device 202 will then decrypt the rule file because the user is allowed access to the data based on a rule set associated with data governing access to the data on server 108. If there is data available for access by the user, device 202 will access and decrypt the data from server 108. An exemplary decryption algorithm includes a symmetric encryption system such as Rijndael. The encryption key to the data will be provided to device 202 because the user is allowed access to the data based on the rule set.

Device 202 then analyzes the subset file 208 and compares subset file 208 to source data 210 (not shown) located on device 202. Exemplary analysis of subset file 208 includes searching, sorting, and filtering the subset file 208 and source data 210 to create a composite data 204. Exemplary embodiments of the composite data 204 include lists of individuals and companies that contain a strong relationship status to a user. Or the composite data could include status updates and messages stored in the various subset files. The composite data 204 can then be viewed by the user of device 202 for further analysis. In one exemplary embodiment, composite data 204 can only be viewed on device 202 and cannot be uploaded or exported to another device or server. However, in yet another exemplary embodiment, composite data 204 can be uploaded or exported by device 202 to another device or server.

Referring to FIG. 3, shown is an expanded view of an exemplary embodiment of composite data 204 suitable for use in practicing exemplary embodiments of this disclosure. Shown in FIG. 3 is device 202, which maintains composite data 204. Shown adjacent to device 202 in FIG. 3 is one possible arrangement of composite data 204 for the user of device 202 to view.

The first item listed depicts the companies and contacts that are accessible by the user. In other words, exemplary embodiments of this list include the list of known companies and contacts (and other third party users) including relationships between them. Shown are two exemplary views for accessing this information. Letter (a) illustrates an exemplary list that includes an overall ranking or ability of the user to reach or influence through his relationship network a particular individual or company. The overall ranking or ability in exemplary embodiments can be based on email activity between the individual or company and the user herself or between others within her relationship network. It can also be based on the number of prior meetings held between the individual or company and the user herself or between others within her relationship network, or based on how recent the prior meetings were or seniority of the individual with the company, or similar combinations of activity-based data.

FIG. 3 also depicts at letter (b) an exemplary relationship view of the companies and contacts accessible. In this view, exemplary embodiments allow the user to view an individual's (the user or another individual) reach or influence with a particular individual, company or organization. In other words, this view allows a user to accurately measure whether a particular individual has the strongest ties to a person, company or organization and whether there might be another person who has stronger ties to the particular person, company or organization. This view also allows viewing the specific contacts at a given company known by the particular person, and the strength of each such relationship. This view also allows viewing the specific contacts at a given company known by the particular person (user), and the strength of each such relationship.

FIG. 3 also depicts next to number 2, an exemplary set of status updates, notes, or images in a timeline format. Here, in exemplary embodiments, the user will be able to scroll through a listing of the most relevant status updates, notes, images and other information that are generally available from social networking sites or that another user has made available to the user of device 202, including but not limited to those authored on device 202 using the publisher's application. In other exemplary embodiments, the status updates, notes, images or other information is data that is specifically provided by users, companies or organizations as app generated subset data 106 and accessible only if the user of device 202 is granted access by the corresponding rule set.

Referring to FIG. 4, presented is an alternative simplified signaling diagram between devices suitable for use in practicing exemplary embodiments of this disclosure. Shown in FIG. 4 is first user device 402 including a first data (D1) 404, an encrypted first data (ED1) 406, a rule set (R1), and an encrypted rule set (ER) 410. Also, shown in FIG. 4 is a server or simple file storage (SFS) 418, and a second user device 412 including an identity authentication (Id) 414.

Exemplary embodiments of the first user device 402 and the second user device 412 include any type of electronic device or user equipment (UE) that can itself maintain data and is capable of wired or wireless transmission of data. Exemplary embodiments of the first user device 402 and the second user device 412 include a processor, input/output interface such as a display, a memory, a transmitter, and a receiver for transmitting and receiving data. Exemplary embodiments of the first user device 402 and the second user device 412 include cellphones, smartphones, tablets, laptop computers, desktop computers, and portable electronic devices. Exemplary embodiments of the first user device 402 and the second user device 412 are able to maintain a user's status updates, contact lists, friend's lists, and social networks.

Exemplary embodiments of SFS 418 include any type of server that is known in the art including, but not limited to, for the avoidance of doubt, web servers and file servers. Exemplary embodiments of SFS 418 include one or multiple processors, memories, transmitters and receivers for transmitting and receiving data wired or wirelessly. Exemplary embodiments of SFS 418 include a single server and multiple servers. Exemplary SFS 418 include Google Drive, SkyDrive, Windows File System, Drop Box and the like.

In practice, as depicted in FIG. 4, the first user device 402 maintains D1 404. Exemplary embodiments of D1 404 include any type of data that can be maintained locally on a memory of the first user device 402. Exemplary embodiments of D1 404 include information regarding a user's relationships with other individuals or organizations. Exemplary embodiments of D1 404 also include relationship information that is not publically accessible or accessible only by third parties. In other exemplary embodiments, D1 404 includes user status updates, images, audio or video files. In another exemplary embodiment, D1 404 includes a user's contact information, information regarding the user's relationships, contact information of the user's relationships, the user's employment information, employment information of the user's relationships, the user's social media information, social media information of the user's relationships, and metadata indicating frequency and recency of communications with other parties. In a further exemplary embodiment, D1 404 can include geographic location information of the first user device 402 associated with particular status updates, images, audio or video files, or a given point in time. In yet a further exemplary embodiment, D1 404 can include geographic location information related to the locations of the user's relationships with other individuals or organizations. For instance, D1 404 may include map or geographic location information indicating geographic locations of the user's relationships or the geographic locations which include the geographic areas that are the most densely populated with the user's relationships or contacts.

D1 404 is then encrypted by the first user device 402 into ED1 406. In some exemplary embodiments, D1 404 is encrypted by an application, the application having been provided by a publisher, company, or other service provider. The first user device 402 then creates a rule set or rule file (R1) 408. R1 408 provides rules that govern who and which entities have access to D1 404. For instance, R1 408 may specify that third parties may only have access to D1 404 provided that the third party also shares a data with a rule set that allows the user of the first user device 402 to have access to D1 404 (i.e., reciprocal sharing of data). In another exemplary embodiment, R1 408 simply specifies specific third parties that are allowed access to D1 404. R1 408 is then encrypted by the first user device 402 into ER1 410. In some exemplary embodiments, R1 408 is encrypted by an application, the application having been provided by a publisher, company, or other service provider.

Exemplary embodiments of D1 404 and R1 408 include wherein D1 404 and R1 408 are portions of the same file or data. In other exemplary embodiments, D1 404 and R1 408 are separate files or data, but are linked to one another such that a processor, memory, electronic device, user equipment, and the like are able to determine that R1 408 applies to D1 404.

Next, the first user device 402 uploads ED1 406 with ER1 410 to SFS 418. Once ED1 406 with ER1 410 has been uploaded to SFS 418, they are available for download/access by any electronic device (e.g., second user device 412) that has been given access to ED1 406 by ER1 410.

The second user device 412 will undergo an identity authentication, shown in FIG. 4 as Id 414, procedure by the publisher's application to verify the identity of the user of the second user device 412. For instance, the verification may include verifying ownership of a user's email address, or verifying ownership of a social network account. Verification of the identity of the user of the second user device 412 may also include input of biometric data (e.g., the user's fingerprint, palm print, retina scan), which can be checked against known biometric data of users that are allowed access.

Once the identity of the user of the second user device 412 has been authenticated, the second user device 412 will then discover files or data that are accessible by the user of the second user device 412. For instance, the second user device 412 may search SFS 418 for files or data that may be accessible by the user of the second user device 412. In yet another exemplary embodiment, the second user device 412 will "know" which files or data may be accessible on SFS 418 by the user of the second user device 412 by responding to notifications sent to the second user device 412 indicating newly shared or available files.

Next, the second user device 412 will decrypt ER1 410. In one embodiment, the second user device 412 will decrypt ER1 410 through the application of the publisher. In some embodiments, this may include the application providing the second user device 412 with a decryption key.

The second user device 412 will then determine based on decrypted ER1 410, which is R1 408, whether the user of the second user device 412 has access or should be granted access to D1 404. If the user of the second user device 412 should be granted access to D1 404 based on R1 408, the second user device 412 will access ED1 406 located on SFS 418. This may include downloading ED1 406 to the second device 412. Once ED1 406 is accessed or downloaded by the second user device 412, the second user device 412 will decrypt ED1 406 to obtain D1 404 for use by the second user device 412.

It should be appreciated that all of the steps set forth in FIG. 4 can be performed by an electronic device, a user equipment (UE), web server, or application running on any such device or equipment.

FIG. 5 presents a summary of the above teachings for data exchange. Block 502 presents (a) accessing, by a user equipment (UE), a first data; (b) analyzing, by the UE, the first data; (c) extracting, by the UE, a second data, the second data being based on the analyzed first data; (d) creating, by the UE, a rule set, the rule set governing access to the second data; (e) uploading, by the UE, the second data to the user selected server, the user selected server being independently controlled without requiring access by a publisher, the second data being accessible at the user selected server based on the rule set. Then block 504 specifies wherein the second data can be accessed on the user selected server by a third party UE and downloaded by the third party UE for aggregation and analysis.

Some of the non-limiting implementations detailed above are also summarized at FIG. 5 following block 504. Block 506 specifies wherein the third party UE is a company's server. Block 508 relates to wherein the third party UE comprises a plurality of third party UE's. Block 510 goes on to specify wherein the second data is encrypted and wherein only the UE and the third party UE are supplied an encryption key by the publisher. Block 512 then further specifies wherein the rule set requires the third party UE to upload a fourth data with a second rule set governing access to the fourth data, the second rule set allowing access to the fourth data by the UE.

Block 514 states that the method further comprising updating, by the UE, the second data with a third data, the third data including a second rule set governing access to the third data. Block 516 specifies wherein the second rule set replaces the rule set governing access to the first data. Block 518 then relates to wherein the first data comprises information about contacts, companies, relationships, geographic location data, and status updates. The present system thus securely provides a user with access to a select amount of another user's relationship data through a user selected server. The system then allows the user to analyze the other user's relationship data in order to compare it to the user's relationship data so as to provide a better understanding of relationships with other individuals or companies.

The logic diagram of FIG. 5 may be considered to illustrate the operation of a method, a result of execution of computer program instructions stored in a computer-readable medium. The logic diagram of FIG. 5 may also be considered a specific manner in which components of the device are configured to cause that device to operate, whether such a device is a mobile phone, cell phone, smart phone, laptop, tablet, desktop or other electronic device, or one or more components thereof. The various blocks shown in FIG. 5 may also be considered as a plurality of coupled logic circuit elements constructed to carry out the associated function(s), or specific result of strings of computer program instructions or code stored in memory.

Various embodiments of the computer-readable medium include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. Various embodiments of the processor include but are not limited to general purpose computers, special purpose computers, microprocessors digital signal processors and multi-core processors.

Reference is now made to FIG. 6 for illustrating a simplified block diagram of the various electronic devices and apparatus that are suitable for use in practicing exemplary embodiments of the present disclosure. In FIG. 6, server 606 is adapted for communication over wireless link A with user equipment (UE) 602. Similarly, server 606 is adapted for communication over wireless link B with UE 604. In other exemplary embodiments, server 606 can communicate with UE 602 and UE 604 through wired connections, wireless connections, or a combination of both. Server 606 may include a single server or a plurality of servers.

UE 602 may include processing means such as a processing system and/or at least one data processor (DP) 602A, storing means such as at least one computer-readable medium or computer-readable memory (MEM) 602B storing at least one computer program (PROG) 602C, and also communicating means such as a transmitter (TX) 602D and receiver (RX) 602E for bidirectional wireless communications with server 606 and/or UE 604 and/or any other UE's (not shown) via one or more antennas 602F as known in the art.

Server 606 includes its own processing means such as a processing system and/or at least one data processor (DP) 606A, storing means such as at least one computer-readable memory (MEM) 606B storing at least one computer program (PROG) 606C, and communicating means such as a transmitter (TX) 606D and a receiver (RX) 606E for bidirectional wireless communications with other devices as known in the art.

Similarly, UE 604 includes its own processing means such as processing system and/or at least one data processor (DP) 604A, storing means such as at least one computer-readable memory (MEM) 604B storing at least one computer program (PROG) 604C, and communicating means such as a transmitter (TX) 604D and a receiver (RX) 604E for bidirectional wireless communications with other devices via one or more antennas 604F as known in the art.

While not particularly illustrated in FIG. 6, UE 602, UE 604, and server 606 are also assumed to include as part of their wireless communicating means modem which may be inbuilt on a RF front end chip within those devices 602, 604, 606 and which chip also carries the TX 602D/604D/606D and the RX 602E/604E/606E.

Various embodiments of UE 602 can include, but are not limited to: cellular telephones (or mobile telephones) including smartphones, data cards, USB dongles, laptop computers, personal portable digital devices having wireless communication capabilities including but not limited to laptop/palmtop/tablet computers, digital cameras and music devices, and internet appliances.

At least one of the PROGs 602C or 604C in UE 602 or UE 604 is assumed to include program instructions that, when executed by the associated DP 602A, 604A, enable the device to operate in accordance with embodiments of the present invention, as detailed above. Server 606 may also have software stored in its MEM 606B to implement certain aspects of these teachings. In these regards, embodiments of this disclosure may be implemented at least in part by computer software stored on the MEM 602B, 604B, 606B which is executable by DP 602A of UE 602, DP 604A of UE 604, and/or DP 606A of server 606, or by hardware, or by a combination of tangibly stored software and hardware (and tangibly stored firmware). Electronic devices implementing these aspects of the disclosure need not be the entire devices as depicted at FIG. 6, but embodiments may be implemented by one or more components of same such as the above described tangibly stored software, hardware, firmware and DP, or a system on a chip SOC, an application specific integrated circuit ASIC or a digital signal processor DSP.

Various embodiments of the computer readable MEMs 602B, 604B, and 606B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 602A, 604A, and 606A include but are not limited to general purpose computers, special purpose computers, microprocessors, digital signal processors (DSPs) and multi-core processors.

FIG. 7 presents a summary of the above teachings for data exchange. Block 702 presents (a) specifying, by a user equipment (UE), a first data; (b) creating, by the UE, a rule set, the rule set governing access to the first data; (e) uploading, by the UE, the first data with the rule set to a user selected server, the first data being accessible at the user selected server based on the rule set. Then block 704 specifies wherein the first data comprises status updates, images, geographic location data of the UE, and social networking communications.

Following block 704, block 706 states wherein the first data comprises a user's relationship information, contact information, employment information, social media information, and metadata indicating frequency and recency of communications. Then block 708 goes on to specify wherein the rule set identifies third parties that are allowed access to the first data. Block 710 further specifies wherein the first data and the rule set are encrypted using an encryption algorithm specified by a publisher. Block 712 states wherein the rule set comprises a rule governing whether a second user can grant access to the first data to third parties. Then at block 714 relates to wherein the rule set allows access to the first data for third parties that reciprocally share data similar to the first data.

Reference is now made to FIG. 8 which presents another alternative logic flow diagram in accordance with a method, apparatus, and computer-readable medium for performing exemplary embodiments of this disclosure. Block 802 presents (a) authenticating, by a user equipment (UE), an identity of a user of the UE; (b) discovering, by the UE, a data including a rule set that is discoverable by the UE, the rule set governing access to the data; (c) determining, by the UE, whether the user of the UE is allowed access to the data based on the rule set; and (d) in response to determining that the user of the UE is allowed access, accessing, by the UE, the data. Block 804 specifies the method further comprising in response to authenticating, storing, by the UE, the identity of the user of the UE on the UE in an encrypted tamper-proof format.

Some of the non-limiting implementations detailed above are also summarized at FIG. 8 following block 804. Block 806 specifies wherein the data comprises status updates, images, geographic location data of the UE, and social networking communications. Block 808 then specifies wherein the data comprises a third party's relationship information, contact information, employment information, social media information, and metadata indicating frequency and recency of communications. Block 810 further states wherein the data comprises a third party's relationship information, contact information, employment information, social media information, and metadata indicating frequency and recency of communications. Block 812 goes on to state wherein the rule set comprises a rule governing whether the user can grant access to the data to third parties. Then block 814 relates to wherein the rule set allows access to the data for third parties that reciprocally share data similar to the data.

The logic diagram of FIG. 7 and FIG. 8 may be considered to illustrate the operation of a method, a result of execution of computer program instructions stored in a computer-readable medium. The logic diagram of FIG. 7 and FIG. 8 may also be considered a specific manner in which components of the device are configured to cause that device to operate, whether such a device is a mobile phone, cell phone, smart phone, laptop, tablet, desktop or other electronic device, or one or more components thereof. The various blocks shown in FIG. 7 and FIG. 8 may also be considered as a plurality of coupled logic circuit elements constructed to carry out the associated function(s), or specific result of strings of computer program instructions or code stored in memory.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

Further exemplary embodiments according to this disclosure include the following embodiments below:

Embodiment 1: A method for data exchange, the method comprising: (a) accessing, by a user equipment (UE), a first data, the first data being located on a server, the first data being associated with a third party UE and including a rule set governing access to the first data; (b) analyzing, by the UE, the first data and a second data, the second data being located on the UE; (c) creating, by the UE, a third data, the third data being based on a correspondence between the analyzed first data and the analyzed second data; (d) creating, by the UE, a second rule set, the second rule set governing access to the third data; (e) connecting, by the UE, to a user selected server, the user selected server being independently controlled and not accessible by a publisher; (f) uploading, by the UE, the third data to the user selected server, the third data being accessible at the user selected server based on the second rule set.

Embodiment 2: The method according to embodiment 1, wherein the third data can be accessed, aggregated, and analyzed on the user selected server by the third party UE.

Embodiment 3: The method according to embodiment 2, wherein the third party UE comprises a plurality of third party UE's.

Embodiment 4: The method according to embodiment 1, the method further comprising updating, by the UE, the third data with a fourth data, the fourth data including a third rule set governing access to the fourth data.

Embodiment 5: The method according to embodiment 2, wherein the third data is encrypted and wherein only the UE and the third party UE are supplied an encryption key.

Embodiment 6: The method according to embodiment 2, wherein the second rule set requires the first data governed by the rule set to allow access to the first data by the UE.

Embodiment 7: The method according to embodiment 1, wherein the third rule set replaces the second rule set governing access to the third data.

Embodiment 8: An apparatus for exchanging data, the apparatus comprising at least one processor and a memory storing computer instructions executable by the at least one processor, wherein the memory with the computer instructions and the processor are configured to cause the apparatus to at least: access a first data, the first data being located on a server, the first data being associated with a third party UE and including a rule set governing access to the first data; analyze the first data and a second data, the second data being located on the memory; create a third data, the third data being based on a correspondence between the analyzed first data and the analyzed second data; create a second rule set, the second rule set governing access to the third data; connect to a user selected server, the user selected server being independently controlled and not accessible by a publisher; upload the third data to the user selected server, the third data being accessible at the user selected server based on the second rule set.

Embodiment 9: The apparatus according to embodiment 8, wherein the third data can be accessed, aggregated, and analyzed on the user selected server by the third party UE.

Embodiment 10: The apparatus according to embodiment 9, wherein the third party UE comprises a plurality of third party UE's.

Embodiment 11: The apparatus according to embodiment 8, the memory with the computer instructions and the processor are configured to further cause the apparatus to update, by the UE, the third data with a fourth data, the fourth data including a second rule set governing access to the fourth data.

Embodiment 12: The apparatus according to embodiment 9, wherein the second data is encrypted and wherein only the UE and the third party UE are supplied an encryption key.

Embodiment 13: The apparatus according to embodiment 9, wherein the second rule set requires the first data governed by the rule set to allowing access to the first data by the UE.

Embodiment 14: The apparatus according to embodiment 8, wherein the third rule set replaces the second rule set governing access to the third data.

Embodiment 15: A non-transitory computer-readable medium tangibly storing computer program instructions which when executed by a processor, cause the processor to at least: access a first data, the first data being located on a server, the first data being associated with a third party UE and including a rule set governing access to the first data; analyze the first data and a second data, the second data being located on the computer-readable medium; create a third data, the third data being based on a correspondence between the analyzed first data and the analyzed second data; create a second rule set, the second rule set governing access to the third data; connect to a user selected server, the user selected server being independently controlled and not accessible by a publisher; upload the third data to the user selected server, the third data being accessible at the user selected server based on the second rule set.

Embodiment 16: The non-transitory computer-readable medium according to embodiment 15, wherein the third data can be accessed, aggregated, and analyzed on the user selected server by the third party UE.

Embodiment 17: The non-transitory computer-readable medium according to embodiment 16, wherein the third party UE comprises a plurality of third party UE's.

Embodiment 18: The non-transitory computer-readable medium according to embodiment 10, wherein the first data comprises a list of contacts.

Embodiment 19: The non-transitory computer-readable medium according to embodiment 16, wherein the second data is encrypted and wherein only the UE and the third party UE are supplied an encryption key.

Embodiment 20: The non-transitory computer-readable medium according to embodiment 16, wherein the second rule set requires the first data governed by the rule set to allowing access to the first data by the UE.

Embodiment 21: The non-transitory computer-readable medium according to embodiment 15, wherein the third rule set replaces the second rule set governing access to the third data.

Embodiment 22: A method for data exchange, the method comprising: (a) a first user causing a first data (D1) to be encrypted by an encryption algorithm specified by a publisher to create an encrypted file (ED1); (b) specifying email addresses, social network handles, and other identifiers of entities that are potentially eligible to access and decrypt ED1 (potentially permitted parties or PPP); (c) creating a rule file (R1) specifying the PPP identifiers and any additional rules that must be met in order for the PPP entity to decrypt ED1 to access D1, wherein R1 includes information that is required by the publisher's algorithm in order to decrypt ED1 (Salt1) (or information that can be used to obtain Salt1); (d) encrypting R1 to create an encrypted file ER1 that is only readable by using publisher's application; (e) uploading the encrypted data D1 (ED1) to a user selected file storage (SFS) not controlled by the publisher; (f) uploading the encrypted rule file ER1 to the SFS; (g) authenticating an identity of a second user by a second instance of publisher's application, either by verifying ownership of the user's email address, verifying ownership of a social network via OAuth or similar means, or otherwise ascertaining the second user's identity relative to PPP identifiers; (h) discovering ER1 on the SFS by the second user's instance of the publisher's application, either by searching accessible shared files to find those that are encrypted rule files, responding to notifications sent to the second user about newly shared files, or other similar means of discovering accessible files on the SFS; (i) decrypting ER1 by the second user's instance of publisher's application (PA2), where only publisher's application can at this point access the decrypted rules file R1; (k) determining by PA2 whether the second user should be granted access to D1, based on a comparison of PPP identifiers to authenticated identifiers and/or an analysis of whether supplemental rules were met (e.g., a requirement that the second user reciprocally share with the first user); (I) PA2 accessing ED1 based on information about ED1's location on the SFS that is either contained within ER1 or inferred based on syntax and context; (m) PA2 decrypting ED1, using Salt1, to grant the second user access to the data D1.

Embodiment 23: The method according to embodiment 22, wherein ER1 is metadata associated with ED1 rather than being a separate file per se.

Embodiment 24: The method according to embodiment 22, wherein the second user's identity verification, once affirmed by PA2, is securely stored by PA2 in an encrypted, tamper-proof format.

Embodiment 25: The method according to embodiment 22, wherein D1 includes status updates, images, geographic location data of the first user, and other information commonly associated with social networking communications.

Embodiment 26: The method according to embodiment 22, wherein the first data D1 includes information about the first user's relationships, including but not limited to contact information, employment information, social media information, and metadata about frequency and recency of communications.

Embodiment 27: The method according to embodiment 22, wherein the rules file R1 includes a rule governing whether and under what circumstances the second user can choose to grant access to certain additional users.

Embodiment 28: The method according to embodiment 27, wherein R1 requires that the second user and any third party users to agree to reciprocally share similar data.

Embodiment 29: A method for data exchange, the method comprising: (a) specifying, by a user equipment (UE), a first data; (b) creating, by the UE, a rule set, the rule set governing access to the first data; (e) uploading, by the UE, the first data with the rule set to a user selected server, the first data being accessible at the user selected server based on the rule set.

Embodiment 30: The method according to embodiment 29, wherein the first data comprises status updates, images, geographic location data of the UE, and social networking communications.

Embodiment 31: The method according to embodiment 29, wherein the first data comprises a user's relationship information, contact information, employment information, social media information, and metadata indicating frequency and recency of communications.

Embodiment 32: The method according to embodiment 29, wherein the rule set identifies third parties that are allowed access to the first data.

Embodiment 33: The method according to embodiment 29, wherein the first data and the rule set are encrypted using an encryption algorithm specified by a publisher.

Embodiment 34: The method according to embodiment 29, wherein the rule set comprises a rule governing whether a second user can grant access to the first data to third parties.

Embodiment 35: The method according to embodiment 29, wherein the rule set allows access to the first data for third parties that reciprocally share data similar to the first data.

Embodiment 36: An apparatus for exchanging data, the apparatus comprising at least one processor and a memory storing computer instructions executable by the at least one processor, wherein the memory with the computer instructions and the processor are configured to cause the apparatus to at least: (a) specify a first data; (b) create a rule set, the rule set governing access to the first data; (e) upload the first data with the rule set to a user selected server, the first data being accessible at the user selected server based on the rule set.

Embodiment 37: The apparatus according to embodiment 36, wherein the first data comprises status updates, images, geographic location data of the apparatus, and social networking communications.

Embodiment 38: The apparatus according to embodiment 36, wherein the first data comprises a user's relationship information, contact information, employment information, social media information, and metadata indicating frequency and recency of communications.

Embodiment 39: The apparatus according to embodiment 36, wherein the rule set identifies third parties that are allowed access to the first data.

Embodiment 40: The apparatus according to embodiment 36, wherein the first data and the rule set are encrypted using an encryption algorithm specified by a publisher.

Embodiment 41: The apparatus according to embodiment 36, wherein the rule set comprises a rule governing whether a second user can grant access to the first data to third parties.

Embodiment 42: The apparatus according to embodiment 36, wherein the rule set allows access to the first data for third parties that reciprocally share data similar to the first data.

Embodiment 43: A non-transitory computer-readable medium tangibly storing computer program instructions which when executed by a processor, cause the processor to at least: (a) specify a first data; (b) create a rule set, the rule set governing access to the first data; (e) upload the first data with the rule set to a user selected server, the first data being accessible at the user selected server based on the rule set.

Embodiment 44: The non-transitory computer-readable medium according to embodiment 43, wherein the first data comprises status updates, images, geographic location data of the processor, and social networking communications.

Embodiment 45: The non-transitory computer-readable medium according to embodiment 43, wherein the first data comprises a user's relationship information, contact information, employment information, social media information, and metadata indicating frequency and recency of communications.

Embodiment 46: The non-transitory computer-readable medium according to embodiment 43, wherein the rule set identifies third parties that are allowed access to the first data.

Embodiment 47: The non-transitory computer-readable medium according to embodiment 43, wherein the first data and the rule set are encrypted using an encryption algorithm specified by a publisher.

Embodiment 48: The non-transitory computer-readable medium according to embodiment 43, wherein the rule set comprises a rule governing whether a second user can grant access to the first data to third parties.

Embodiment 49: The non-transitory computer-readable medium according to embodiment 43, wherein the rule set allows access to the first data for third parties that reciprocally share data similar to the first data.

Embodiment 50: A method of data exchange, the method comprising: (a) authenticating, by a user equipment (UE), an identity of a user of the UE; (b) discovering, by the UE, a data including a rule set that is discoverable by the UE, the rule set governing access to the data; (c) determining, by the UE, whether the user of the UE is allowed access to the data based on the rule set; and (d) in response to determining that the user of the UE is allowed access, accessing, by the UE, the data.

Embodiment 51: The method according to embodiment 50, the method further comprising in response to authenticating, storing, by the UE, the identity of the user of the UE on the UE in an encrypted tamper-proof format.

Embodiment 52: The method according to embodiment 50, wherein the data comprises status updates, images, geographic location data, and social networking communications.

Embodiment 53: The method according to embodiment 50, wherein the data comprises a third party's relationship information, contact information, employment information, social media information, and metadata indicating frequency and recency of communications.

Embodiment 54: The method according to embodiment 50, wherein the rule set comprises a rule governing whether the user can grant access to the data to third parties.

Embodiment 55: The method according to embodiment 50, wherein the rule set allows access to the data for third parties that reciprocally share data similar to the data.

Embodiment 56: An apparatus for exchanging data, the apparatus comprising at least one processor and a memory storing computer instructions executable by the at least one processor, wherein the memory with the computer instructions and the processor are configured to cause the apparatus to at least: (a) authenticate an identity of a user of the apparatus; (b) discover a data including a rule set that is discoverable by the apparatus, the rule set governing access to the data; (c) determine whether the user of the apparatus is allowed access to the data based on the rule set; and (d) in response to determining that the user of the apparatus is allowed access, access the data.

Embodiment 57: The apparatus according to embodiment 56, the memory with the computer instructions and the processor are configured to further cause the apparatus to in response to authenticating, storing the identity of the user of the apparatus on the memory in an encrypted tamper-proof format.

Embodiment 58: The apparatus according to embodiment 56, wherein the data comprises status updates, images, geographic location data, and social networking communications.

Embodiment 59: The apparatus according to embodiment 56, wherein the data comprises a third party's relationship information, contact information, employment information, social media information, and metadata indicating frequency and recency of communications.

Embodiment 60: The apparatus according to embodiment 56, wherein the rule set comprises a rule governing whether the user can grant access to the data to third parties.

Embodiment 61: The apparatus according to embodiment 56, wherein the rule set allows access to the data for third parties that reciprocally share data similar to the data.

Embodiment 62: A non-transitory computer-readable medium tangibly storing computer program instructions which when executed by a processor, cause the processor to at least: (a) authenticate an identity of a user of the processor; (b) discover a data including a rule set that is discoverable by the processor, the rule set governing access to the data; (c) determine whether the user of the processor is allowed access to the data based on the rule set; and (d) in response to determining that the user of the processor is allowed access, access the data.

Embodiment 63: The non-transitory computer-readable medium according to embodiment 62, the computer program instructions further causing the processor to in response to authenticating, storing the identity of the user of the apparatus on the memory in an encrypted tamper-proof format.

Embodiment 64: The non-transitory computer-readable medium according to embodiment 62, wherein the data comprises status updates, images, geographic location data, and social networking communications.

Embodiment 65: The non-transitory computer-readable medium according to embodiment 62, wherein the data comprises a third party's relationship information, contact information, employment information, social media information, and metadata indicating frequency and recency of communications.

Embodiment 66: The non-transitory computer-readable medium according to embodiment 62, wherein the rule set comprises a rule governing whether the user can grant access to the data to third parties.

Embodiment 67: The non-transitory computer-readable medium according to embodiment 62, wherein the rule set allows access to the data for third parties that reciprocally share data similar to the data.

Embodiment 68: A method for data exchange, the method comprising: (a) accessing, by a user equipment (UE), a first data; (b) analyzing, by the UE, the first data; (c) extracting, by the UE, a second data, the second data being based on the analyzed first data; (d) creating, by the UE, a rule set, the rule set governing access to the second data; (e) uploading, by the UE, the second data with the rule set to a user selected server, the user selected server being independently controlled without required access by a publisher, the second data being accessible at the user selected server based on the rule set.

Embodiment 69: The method according to embodiment 68, wherein the second data can be accessed, aggregated, and analyzed on the user selected server by a third party UE.

Embodiment 70: The method according to embodiment 69, wherein the third party UE is a company's server.

Embodiment 71: The method according to embodiment 69, wherein the third party UE comprises a plurality of third party UE's.

Embodiment 72: The method according to embodiment 68, the method further comprising updating, by the UE, the second data with a third data, the third data including a second rule set governing access to the third data.

Embodiment 73: The method according to embodiment 69, wherein the second data is encrypted and wherein only the UE and the third party UE are supplied an encryption key by the publisher.

Embodiment 74: The method according to embodiment 69, wherein the rule set requires the third party UE to upload a fourth data with a second rule set governing access to the fourth data, the second rule set allowing access to the fourth data by the UE.

Embodiment 75: The method according to embodiment 72, wherein the second rule set replaces the rule set governing access to the first data.

Embodiment 76: The method according to embodiment 69, wherein the first data comprises a list of contacts, calendar appointments, geographic location data, and status updates.

Embodiment 77: An apparatus for exchanging data, the apparatus comprising at least one processor and a memory storing computer instructions, which in computer instructions in select configurations can be a publisher's application, executable by the at least one processor, wherein the memory with the computer instructions and the processor are configured to cause the apparatus to at least: (a) access a first data, the first data; (b) analyze the first data; (b) extract a second data, the second data being based on the analyzed first data; (c) create a rule set, the rule set governing access to the second data; (d) upload the second data to a user selected server, the user selected server being independently controlled without required access by a publisher, the second data being accessible at the user selected server based on the rule set.

Embodiment 78: The apparatus according to embodiment 77, wherein the second data can be accessed, aggregated, and analyzed on the user selected server by a third party UE.

Embodiment 79: The apparatus according to embodiment 78, wherein the third party UE is a company's server.

Embodiment 80: The apparatus according to embodiment 78, wherein the third party UE comprises a plurality of third party UE's.

Embodiment 81: The apparatus according to embodiment 77, the memory with the computer instructions and the processor are configured to further cause the apparatus to update, by the UE, the second data with a third data, the third data including a second rule set governing access to the third data.

Embodiment 82: The apparatus according to embodiment 78, wherein the second data is encrypted and wherein only the UE and the third party UE are supplied an encryption key by the publisher.

Embodiment 83: The apparatus according to embodiment 78, wherein the rule set requires the third party UE to upload a fourth data with a second rule set governing access to the fourth data, the second rule set allowing access to the fourth data by the UE.

Embodiment 84: The apparatus according to embodiment 81, wherein the second rule set replaces the rule set governing access to the first data.

Embodiment 85: The apparatus according to embodiment 77, wherein the first data comprises a list of contacts, calendar appointments, geographic location data, and status updates.

Embodiment 86: A non-transitory computer-readable medium tangibly storing computer program instructions which when executed by a processor, cause the processor to at least: (a) access a first data, the first data being located on the computer-readable medium; (b) analyze the first data with an application from a publisher; (c) extract a second data, the second data being based on the analyzed first data; (d) create a rule set, the rule set governing access to the second data; (e) upload the second data to a user selected server, the user selected server being independently controlled without required access by a publisher, the second data being accessible at the user selected server based on the rule set.

Embodiment 87: The non-transitory computer-readable medium according to embodiment 86, wherein the second data can be accessed, aggregated, and analyzed on the user selected server by a third party UE.

Embodiment 88: The non-transitory computer-readable medium according to embodiment 87, wherein the third party UE is a company's server.

Embodiment 89: The non-transitory computer-readable medium according to embodiment 87, wherein the third party UE comprises a plurality of third party UE's.

Embodiment 90: The non-transitory computer-readable medium according to embodiment 86, the computer program instructions further causing the processor to update, by the UE, the second data with a third data, the third data including a second rule set governing access to the third data.

Embodiment 91: The non-transitory computer-readable medium according to embodiment 87, wherein the second data is encrypted and wherein only the UE and the third party UE are supplied an encryption key by the publisher.

Embodiment 92: The non-transitory computer-readable medium according to embodiment 87, wherein the rule set requires the third party UE to upload a fourth data with a second rule set governing access to the fourth data, the second rule set allowing access to the fourth data by the UE.

Embodiment 93: The non-transitory computer-readable medium according to embodiment 90, wherein the second rule set replaces the rule set governing access to the first data.

Embodiment 94: The non-transitory computer-readable medium according to embodiment 86, wherein the first data comprises a list of contacts, calendar appointments, geographic location data, and status updates.

This disclosure has been described in detail with particular reference to a presently preferred embodiment, but it will be understood that variations and modifications can be effected within the spirit and scope of the invention. The presently disclosed embodiments are therefore considered in all respects to be illustrative and restrictive. The scope of the invention is indicated by the appended claims, and all changes that come within the meaning and range of equivalents thereof are intended to be embraced therein.

The invention claimed is:

1. A method for data exchange, the method comprising:
   (a) specifying, by an application from a publisher operating on a user equipment (UE), a first data, the first data being stored on the UE;
   (b) aggregating, by the application from the publisher operating on the UE, the first data into a subset of the first data in response to user applied criteria, wherein the subset of the first data is metadata;
   (c) creating, by the application from the publisher operating on the UE, a rule set, the rule set being stored on the UE and governing access to the subset of the first data; and
   (d) uploading, by the application from the publisher operating on the UE, the subset of the first data with the rule set to a user selected server, the subset of the first data being accessible at the user selected server based on the rule set only by third parties having a corresponding application from the publisher, wherein the user selected server is independently controlled and inaccessible by the publisher, and wherein the step of uploading the subset of the first data with the rule set to the user selected server is carried out after aggregating the subset of the first data and creating the rule set.

2. The method according to claim 1, wherein the first data comprises status updates, images, geographic location data of the UE, and social networking communications.

3. The method according to claim 1, wherein the first data comprises a user's relationship information, contact information, employment information, social media information, and metadata indicating frequency and recency of communications.

4. The method according to claim 1, wherein the rule set identifies third parties that are allowed access to the first data.

5. The method according to claim 1, wherein the first data and the rule set are encrypted using an encryption algorithm specified by the publisher.

6. The method according to claim 1, wherein the rule set comprises a rule governing whether a second user can grant access to the first data to third parties.

7. The method according to claim 1, wherein the rule set allows access to the first data for third parties that reciprocally share data similar to the first data.

8. An apparatus for exchanging data, the apparatus comprising at least one processor and a memory storing computer instructions from a publisher executable by the at least one processor, wherein the memory with the computer instructions and the processor are configured to cause the apparatus to at least:
(a) specify a first data, the first data being stored on the UE;
(b) aggregate, by the application from the publisher operating on the UE, the first data into a subset of the first data in response to user applied criteria, wherein the subset of the first data is metadata;
(c) create a rule set, the rule set being stored on the UE and governing access to the subset of the first data;
(d) upload the subset of the first data with the rule set to a user selected server, the subset of the first data being accessible at the user selected server based on the rule set only by third parties having a corresponding application from the publisher, wherein the user selected server is independently controlled and inaccessible by the publisher, and wherein the step of uploading the subset of the first data with the rule set to the user selected server is carried out after aggregating the subset of the first data and creating the rule set.

9. The apparatus according to claim 8, wherein the first data comprises status updates, images, geographic location data of the apparatus, and social networking communications.

10. The apparatus according to claim 8, wherein the first data comprises a user's relationship information, contact information, employment information, social media information, and metadata indicating frequency and recency of communications.

11. The apparatus according to claim 8, wherein the rule set identifies third parties that are allowed access to the first data.

12. The apparatus according to claim 8, wherein the first data and the rule set are encrypted using an encryption algorithm specified by the publisher.

13. The apparatus according to claim 8, wherein the rule set comprises a rule governing whether a second user can grant access to the first data to third parties.

14. The apparatus according to claim 8, wherein the rule set allows access to the first data for third parties that reciprocally share data similar to the first data.

15. A non-transitory computer-readable medium tangibly storing computer program instructions from a publisher which when executed by a processor, cause the processor to at least:
(a) specify a first data, the first data being stored on the UE;
(b) aggregate, by the application from the publisher operating on the UE, the first data into a subset of the first data in response to user applied criteria, wherein the subset of the first data is metadata;
(c) create a rule set, the rule set being stored on the UE and governing access to the subset of the first data;
(d) upload the first data with the rule set to a user selected server, the subset of the first data being accessible at the user selected server based on the rule set only by third parties having a corresponding application from the publisher, wherein the user selected server is independently controlled and inaccessible by the publisher, and wherein the step of uploading the subset of the first data with the rule set to the user selected server is carried out after aggregating the subset of the first data and creating the rule set.

16. The non-transitory computer-readable medium according to claim 15, wherein the first data comprises status updates, images, geographic location data of the processor, and social networking communications.

17. The non-transitory computer-readable medium according to claim 15, wherein the first data comprises a user's relationship information, contact information, employment information, social media information, and metadata indicating frequency and recency of communications.

18. The non-transitory computer-readable medium according to claim 15, wherein the rule set identifies third parties that are allowed access to the first data.

19. The non-transitory computer-readable medium according to claim 15, wherein the first data and the rule set are encrypted using an encryption algorithm specified by the publisher.

20. The non-transitory computer-readable medium according to claim 15, wherein the rule set comprises a rule governing whether a second user can grant access to the first data to third parties.

21. The non-transitory computer-readable medium according to claim 15, wherein the rule set allows access to the first data for third parties that reciprocally share data similar to the first data.

22. The method according to claim 1, wherein the user applied criteria is corresponding to at least one of (i) a number and recency of emails between a user and a given contact, (ii) a number and recency of calendar appointments between the user and the given contact, (iii) a number and recency of phone calls and text messages between the user and the given contact, (iv) a number of connections between the user and the given contact, and (v) an occurrence of certain word choices that appear in communications.

23. The apparatus according to claim 8, wherein the user applied criteria is corresponding to at least one of (i) a number and recency of emails between a user and a given contact, (ii) a number and recency of calendar appointments between the user and the given contact, (iii) a number and recency of phone calls and text messages between the user and the given contact, (iv) a number of connections between the user and the given contact, and (v) an occurrence of certain word choices that appear in communications.

24. The non-transitory computer-readable medium according to claim 15, wherein the user applied criteria is corresponding to at least one of (i) a number and recency of emails between a user and a given contact, (ii) a number and recency of calendar appointments between the user and the given contact, (iii) a number and recency of phone calls and text messages between the user and the given contact, (iv) a number of connections between the user and the given contact, and (v) an occurrence of certain word choices that appear in communications.

* * * * *